US011663563B2

(12) United States Patent
Kohli

(10) Patent No.: US 11,663,563 B2
(45) Date of Patent: May 30, 2023

(54) METHODS AND SYSTEMS OF PROVIDING INTEROPERABILITY BETWEEN INCOMPATIBLE PAYMENT SYSTEMS

(71) Applicant: MASTERCARD INTERNATIONAL INCORPORATED, Purchase, NY (US)

(72) Inventor: Manoneet Kohli, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 50 days.

(21) Appl. No.: 16/922,766

(22) Filed: Jul. 7, 2020

(65) Prior Publication Data

US 2022/0012698 A1   Jan. 13, 2022

(51) Int. Cl.
*G06Q 20/02* (2012.01)
*G06Q 20/36* (2012.01)
(Continued)

(52) U.S. Cl.
CPC ........... *G06Q 20/023* (2013.01); *G06Q 20/34* (2013.01); *G06Q 20/36* (2013.01); *G06Q 20/40* (2013.01); *G06K 19/06037* (2013.01)

(58) Field of Classification Search
CPC ...... G06Q 20/023; G06Q 20/34; G06Q 20/36; G06Q 20/40; G06Q 20/027; G06Q 20/3674; G06K 19/06037
See application file for complete search history.

(56) References Cited

U.S. PATENT DOCUMENTS

| | | | | |
|---|---|---|---|---|
| 9,767,442 B2* | 9/2017 | Killian | ................ | G06Q 20/40 |
| 2006/0041840 A1* | 2/2006 | Blair | ................ | G06Q 10/087 |
| | | | | 715/234 |

(Continued)

FOREIGN PATENT DOCUMENTS

| | | | | |
|---|---|---|---|---|
| AU | 2019213773 A1 * | 8/2019 | ......... | G06Q 20/3821 |
| CA | 2934603 A1 * | 6/2015 | ........... | G06Q 20/023 |

(Continued)

OTHER PUBLICATIONS

EMV QR Code Specification for Payment Systems (EMV QRCPS), Version 1.0, Jul. 2017 (Year: 2017).*

(Continued)

*Primary Examiner* — Bennett M Sigmond
*Assistant Examiner* — James H Miller
(74) *Attorney, Agent, or Firm* — Pillsbury Winthrop Shaw Pittman LLP

(57) ABSTRACT

Systems and computer-implemented methods of providing interoperability between incompatible payment systems may be provided. For example, a server may receive encoded data from a wallet server of the first closed loop payment system, the encoded data using an encoding scheme and being based on a digital encoding of a recipient. The server may identify a receiving institution of the second closed loop payment system based on the encoding scheme. The server may transmit the encoded data to the receiving institution and receive a response from the receiving institution. The response may include a recipient identifier and a recipient attribute. The server may mediate the payment from the sender closed loop account to the recipient closed loop account based on the receiving institution, the recipient identifier and the recipient attribute. For example, the server may perform clearing-and-settlement or switching-and-routing to mediate the payment.

18 Claims, 10 Drawing Sheets

(51) Int. Cl.
*G06Q 20/34* (2012.01)
*G06Q 20/40* (2012.01)
*G06K 19/06* (2006.01)

(56) References Cited

U.S. PATENT DOCUMENTS

| | | | | |
|---|---|---|---|---|
| 2009/0094123 | A1* | 4/2009 | Killian | G06Q 20/3229 705/16 |
| 2010/0017332 | A1* | 1/2010 | Kight | G06Q 20/027 705/64 |
| 2010/0088188 | A1* | 4/2010 | Kumar | G06Q 20/202 705/17 |
| 2013/0124349 | A1* | 5/2013 | Khan | G06Q 20/02 705/41 |
| 2014/0172633 | A1* | 6/2014 | Dogin | G06Q 50/01 705/26.8 |
| 2014/0222599 | A1 | 8/2014 | Wang et al. | |
| 2014/0244496 | A1* | 8/2014 | Langus | G06Q 20/409 705/41 |
| 2014/0365363 | A1 | 12/2014 | Knudsen et al. | |
| 2015/0066756 | A1* | 3/2015 | Killian | G06Q 20/40 705/40 |
| 2017/0032371 | A1* | 2/2017 | Aquilina | G06Q 50/30 |
| 2017/0154332 | A1* | 6/2017 | Vora | G06Q 20/0655 |
| 2017/0256007 | A1* | 9/2017 | Barman | G06Q 20/14 |
| 2017/0300873 | A1* | 10/2017 | Krishna | G06Q 20/223 |
| 2018/0357422 | A1* | 12/2018 | Telang | G06F 21/577 |
| 2019/0295054 | A1* | 9/2019 | Purves | G06Q 20/227 |
| 2020/0034837 | A1* | 1/2020 | Narayan | G06Q 20/20 |
| 2021/0241239 | A1* | 8/2021 | Ferguson | G06Q 20/363 |

FOREIGN PATENT DOCUMENTS

| | | | | |
|---|---|---|---|---|
| WO | WO-2007067351 | A1 * | 6/2007 | G06Q 20/10 |
| WO | WO-2009114876 | A2 * | 9/2009 | G06Q 20/10 |
| WO | WO-2015013548 | A1 * | 1/2015 | G06Q 20/385 |

OTHER PUBLICATIONS

KHQR Code Specification for Retail Payments in Cambodia, Version 1.0, Dec. 2019 (Year: 2019).*
Let's Talk About Interoperability (Year: 2021).*
Towards an Interoperable Mobile Wallet Service (Year: 2013).*
https://www.qr-code-generator.com/blog/qr-codes-vs-barcodes/ (Year: 2020).*
https://www.nps.gov/anti/learn/historyculture/signal.htm (Year: 2015).*
EMV® QR Code Specification for Payment Systems (EMV QRCPS)—Merchant-Presented QR Guidance and Examples (Year: 2018).*
Committee on Payments and Market Infrastructures World Bank Group—Payment aspects of financial inclusion (Year: 2016).*
ITU-T Focus Group Digital Financial Services Payment System Interoperability and Oversight: The International Dimension (Year: 2016).*
International Searching Authority, "International Search report and written opinion, PCT Application No. PCT/US2021/033959", dated Sep. 15, 2021, 11 pages.

* cited by examiner

METHODS AND SYSTEMS OF PROVIDING INTEROPERABILITY BETWEEN INCOMPATIBLE PAYMENT SYSTEMS

BACKGROUND

The use of digital wallets is growing in popularity due in part to the convenience and security that they may offer. A digital wallet may refer to an application of a user device that stores payment information used to initiate a payment from a sender to a recipient, such as to make a purchase from the recipient or otherwise transfer funds to the recipient. Digital wallets may be used in different types of payment systems, such as a closed loop payment system or an open loop payment system.

A closed loop payment system may refer to a payment system in which senders and recipients have accounts with an entity, such as a financial institution (FI), that transfers payments between the sender and recipient accounts. Such a payment system may be referred to as "closed loop" because both a sender and a recipient may be required to have accounts with the same entity.

To illustrate, a transaction between a consumer and a merchant in a closed loop payment system will be described. The closed loop payment system may provide the merchant with a digital encoding such as a Quick Response (QR) code that encodes a merchant identifier. The digital encoding may use a specific encoding scheme used by the closed loop payment system. The merchant may display (such as through physical signage or electronic display) the QR code and request a payment amount. The consumer may scan the QR code with a digital wallet on a user device and input the payment amount. The digital wallet may transmit the QR code (encoded data read from the QR code), the payment amount, and information that identifies the consumer's account, to a wallet server in the closed loop payment system. The wallet server may identify the merchant based on the QR code, verify that the consumer's account has sufficient funds, debit the payment amount, and credit the merchant's account. Some variants of this process may include swapping the role of the party that displays the QR code. For example, one variant may include the consumer displaying, to the merchant, a QR code that identifies the consumer to initiate the payment process.

In either case, both the consumer and the merchant may be required to have accounts in the closed loop payment system. If the consumer attempts to make a purchase at another merchant that participates in another closed loop payment system, the digital wallet (and wallet server) may not recognize the QR code displayed by the merchant. Thus, a digital wallet that stores payment information for an account in a closed loop payment system may not be used to pay a recipient, such as another user or a merchant, that does not also have an account in the closed loop payment system.

An open loop payment system may be similar to a closed loop payment system in terms of user experience, with a difference being that payments may be made from and to different entities, including different FIs, so long as the entities are enrolled in a common payment network such as the Mastercard® interchange network. Thus, an open loop payment system may leverage payment networks that use payment cards that may be accepted worldwide. An example of an open loop payment system includes the Masterpass™ QR payment system. In this example, a digital wallet storing a Mastercard® payment card may be used at any merchant enrolled in an open loop payment system that accepts a Mastercard® payment card.

Because of the popularity of digital wallets, a large number of payment systems have arisen. One issue that has resulted is that these payment systems are diverse and may be incompatible with one another. A payment system may be incompatible with another payment system when a payment from an account of one payment system cannot be made to an account of another payment system. This incompatibility may be due to technology and/or other constraints that prevent interoperability. These and other issues may exist among payment systems.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
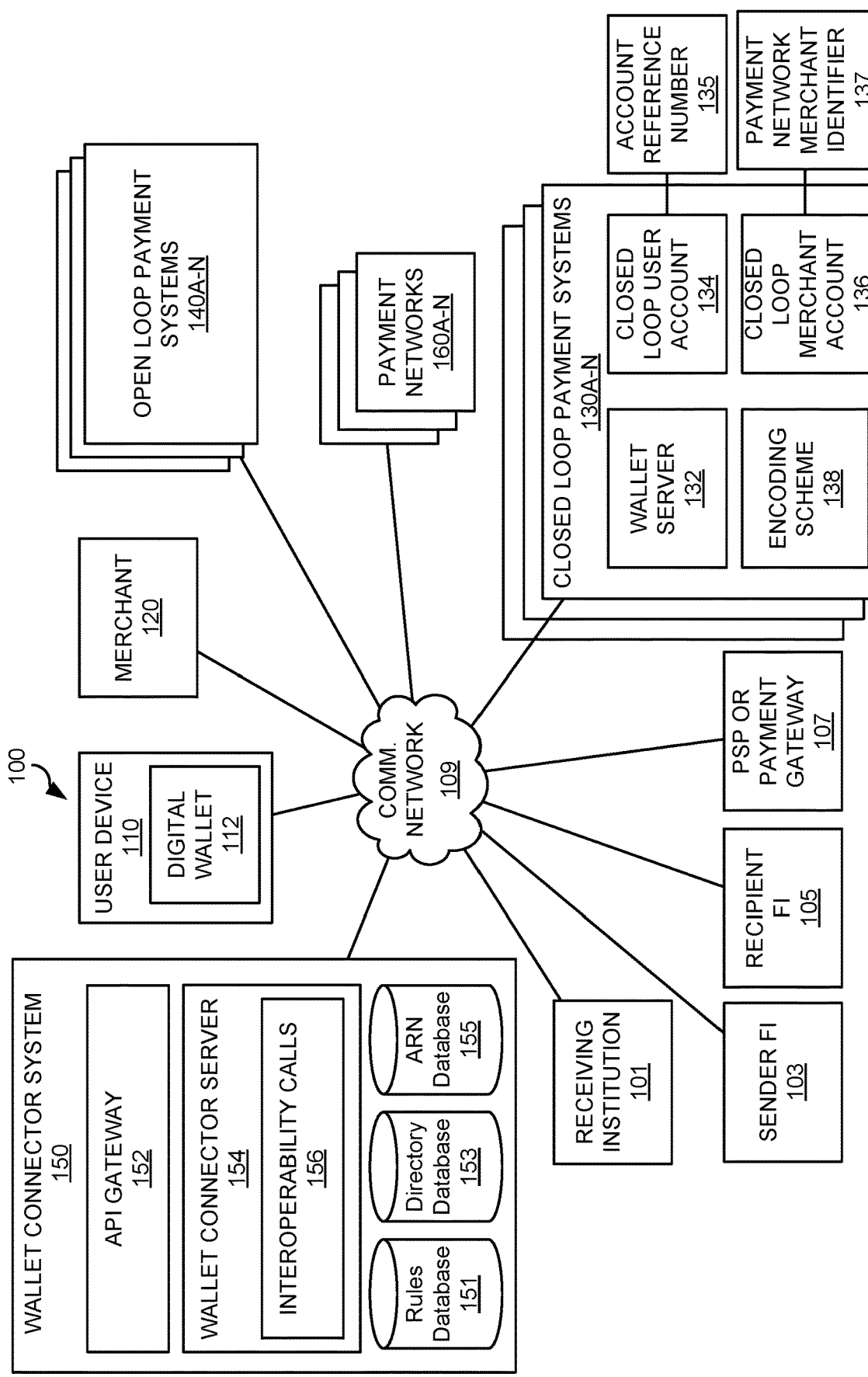
FIG. 1 illustrates an example of a system of providing interoperability between incompatible payment systems.

The disclosure herein relates to methods and systems of providing interoperability of incompatible payment systems. For example, to facilitate interoperability of incompatible payment systems, the wallet connector system may use an Application Programming Interface (API) gateway, which may be exposed by a payment network. The API gateway may refer to network infrastructure that facilitates API routing. The API gateway may be accessed by the payment systems to mediate payments between incompatible payment systems. For purposes of illustration, in the example that follows, a sender will be described as a user having an account in a first closed loop payment system and a recipient will be described as a merchant having an account in a second closed loop payment system that is incompatible with the first closed loop payment system. However, payment for other combinations of incompatible payment systems, senders and recipients may be mediated as well.

In the illustrative example, a user may scan, with a digital wallet, a digital encoding of the merchant to initiate a payment for a purchase. The digital wallet may transmit the QR code (or encoded data read from the QR code) to a wallet server in the first closed loop payment system. The wallet server may not recognize the encoded data because the encoded data may use an encoding scheme of the second closed loop payment system used by the merchant. Thus, instead of processing the payment within the first closed loop payment system, the wallet server may transmit the encoded data, sender identifying information, and payment amount to the wallet connector system for payment mediation.

The wallet connector system may consult a mapping database that stores encoding schemes used by payment systems to identify a receiving institution of the second closed loop payment system that uses the encoding scheme. Once the receiving institution of the second closed loop payment system is identified, the wallet connector system may transmit the encoded data to the receiving institution, which may respond with a merchant identifier and merchant attribute such as an address of the merchant.

If the receiving institution is not identified (such as when the encoding scheme is not stored in the mapping database), the wallet connector system may broadcast the encoded data to receiving institutions of participating payment systems. The receiving institution associated with a payment system that uses the encoding scheme may respond with the merchant identifier and the merchant attribute. The wallet connector system may link the encoding scheme and an identification of the responding receiving institution in the mapping database for future reference. Accordingly, through such broadcasting, the wallet connector system may learn new encoding schemes used by receiving institutions.

In some examples, once the receiving institution, the merchant and the merchant attribute are identified, the wallet connector system may access and apply payment rules to ensure that the first closed loop payment system has approved sending payments to the second closed loop payment system and/or apply acceptance rules to ensure that the second closed loop payment platform has approved receiving payments from the first closed loop payment system.

Subject to any payment and acceptance rules, in some examples, the wallet connector system may further access and apply participation rules that dictate how payment is to be mediated based on the identity of the first and second closed loop payment systems, which may each specify rules for participating in mediated payments. For example, the payment may be mediated through clearing-and-settlement or switching-and-routing.

For clearing-and-settlement, the wallet connector system may leverage a payment network, such as the Mastercard® interchange network, to mediate payments from the sender to the merchant. To do so, the wallet connector system may ensure that both the sender in the first closed loop payment system and the merchant in the second closed loop payment system are recognizable within the payment network. For example, the wallet connector system may determine whether the sender has been assigned with an account reference number, such as a payment card number or other identifier that is assigned for purposes of being recognized on the payment network. If the account reference number is not found for the sender, the wallet connector system may generate an account reference number for the sender and link the sender with the account reference number. For example, the wallet connector system may store sender identifying information with the account reference number that was newly generated for the sender. Similarly, a merchant may be assigned with a payment network merchant identifier (generated at the payment network or by the wallet connector system). The payment network merchant identifier may identify a merchant FI to which payments may be routed by the payment network and a merchant identifier, such as the merchant identifier encoded in the digital encoding. In some examples, the wallet connector system may store the payment network merchant identifier in association with the merchant identifier.

The wallet connector system may transmit the merchant identifying information (which may include the payment network merchant identifier), merchant attribute, and the account reference number if the account reference number was newly generated back to the wallet server in the first closed loop payment system (otherwise, the wallet server or a sender FI may have already stored the account reference number). The wallet server or the sender FI may debit the sender's closed loop user account in the first closed loop payment system and fund an account associated with the account reference number.

The wallet server or sender FI may then use the API gateway to make a payment API call. The payment API call may include the payment amount, the payment network merchant identifier, the merchant attribute, sender identifying information, and/or other payment details. In some examples, the wallet connector system may generate the API call on behalf of the wallet server. Responsive to the payment API call, the wallet connector system may cause funds to be credited to the closed loop merchant account in the second closed loop payment system. For example, the wallet connector system may cause the funds to be credited based on a receive API call or a payment instruction to the payment network.

The receive API call may cause the merchant FI to receive the funds from the payment API call to an account held at the merchant FI, which may then credit the closed loop merchant account in the second closed loop payment system. The payment instruction may initiate a traditional payment card transaction, in which the account reference number is substituted for a payment card number and processed by the payment network as a payment card transaction that credits a merchant with the payment amount. In some examples, responsive to the payment API call, the wallet connector system may transmit a payment credential to a receiving endpoint, such as a Payment Server Provider (PSP) or payment gateway, that may process payments on behalf of the merchant. In these examples, the receiving endpoint may transmit the payment instruction to the payment network.

For switching-and-routing mediation, the wallet connector system may transmit the merchant identifier, the payment amount, and an identification of the second closed loop payment system to the wallet server in the first closed loop payment system. The wallet connector system may receive, from the first closed loop payment system, an approval message. The wallet connector system may transmit, to the second closed loop payment system, an indication of the approval message. The wallet connector system may generate a reconciliation statement indicating a payment transaction between the first closed loop payment system and the second closed loop payment system. The wallet connector system may make the reconciliation statement available to the first closed loop payment system and the second closed loop payment system.

Having described an overview of examples of operation of the wallet connector system, attention will now turn to a system 100 of providing interoperability between incompatible payment systems.

FIG. 1 illustrates an example of a system 100 of providing interoperability between incompatible payment systems.

The system 100 may include a receiving institution 101, a sender FI 103, a recipient FI 105, a PSP or payment gateway 107, a user device 110, a merchant 120, a plurality of closed loop payment systems 130 (individually illustrated as 130A-N), a plurality of open loop payment systems 140 (individually illustrated as 140A-N), a wallet connector system 150, a plurality of payment networks 160 (individually illustrated as payment networks 160A-N), and/or other components. The term "payment system" will refer generally to any of the closed loop payment systems 130 or open loop payment systems 140. The components of the system 100 may be connected to one another via a communication network 109, which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system 100 components may communicate.

A receiving institution 101 may refer to a device of an entity that may receive a payment transaction and posts funds from the payment transaction into a recipient's preferred delivery channel. Examples herein will describe a recipient delivery channel as a payment card or account reference number that serves as a payment card number. However, other types of delivery channels may be used to mediate payments between incompatible payment systems.

A sender FI 103 may refer to a device of an entity that stores funds on behalf of a sender and is enrolled to participate in a payment network 160. The sender FI 103 may therefore fund a payment from the sender.

A recipient FI 105 may refer to a device of an entity that sponsors network activity and settles with payment networks 160 and transaction originators such as closed loop payment systems 130 or the wallet connector system 150 that acts on behalf of the closed loop payment systems 130. In some examples, the recipient FI 105 may be enrolled as an acquirer that interfaces with the payment network 160 and the receiving institution 101 of the closed loop payment system 130 to facilitate payments mediated by the payment network 160 to a closed loop merchant in the closed loop payment system 130. It should be noted that the sender FI 103 with respect to one user may also be a recipient FI 105 with respect to another user or merchant 120.

A PSP or payment gateway 107 may refer to a device of an endpoint that may process payments on behalf of a recipient. In some examples, PSP or payment gateway 107 may process pull payments facilitated by the wallet connector system 150 over the payment network 160.

The user device 110 may include a device such as a smartphone, a tablet device, a wearable device, a personal computer, and/or other device having computational and storage capabilities to send and/or receive payments. For example, a user may use the user device 110 to send a payment to a recipient, such as to purchase goods and/or services from the merchant 120 or otherwise send a payment to another user.

In some examples, the user device 110 may include a digital wallet 112. The digital wallet 112 may include an application that stores payment account information, such as a payment card identifier, a closed loop payment user account identifier, and/or other information identifying an account to send or receive payments. In some examples, the digital wallet 112 may facilitate payments in a closed loop payment system 130. In these examples, the digital wallet 112 may store payment information identifying a closed loop user account 134 in the closed loop payment system 130. When a payment is to be funded from the closed loop user account 134, the closed loop user account 134 may be referred to as a "sender closed loop account." Such a digital wallet 112 may be referred to as a "closed loop digital wallet." In some examples, the digital wallet 112 may facilitate payments in an open loop payment system 140. In these examples, the digital wallet 112 may store payment card numbers for processing on the payment networks 160A-N. Such a digital wallet 112 may be referred to as an "open loop digital wallet." In some examples, a digital wallet 112 may facilitate payments in both a closed loop payment system 130 and an open loop payment system 140. Such a digital wallet 112 may be referred to as a "closed or open loop digital wallet."

The merchant 120 may enroll to participate in a closed loop payment system 130 or open loop payment system 140. If the merchant 120 is enrolled in a closed loop payment system 130, then the merchant 120 may receive payments from a user device 110 having a digital wallet 112 that also participates in the same closed loop payment system 130. Such merchant may be referred to as a "closed loop merchant." If the merchant 120 is enrolled in an open loop payment system 140, then the merchant 120 may receive payments from a user device 110 having a digital wallet 112 that participates in an open loop payment system 140. Such merchant may be referred to as an "open loop merchant." In some examples, a merchant 120 may enroll in both a closed loop payment system 130 and an open loop payment system 140, in which case the merchant 120 may be referred to as an "open or closed loop merchant." Without mediation by the wallet connector system 150, a closed loop merchant may be unable to receive payments from a closed loop digital wallet of a different closed loop payment system. Similarly, without mediation by the wallet connector system 150, a closed loop merchant may be unable to receive payments from an open loop digital wallet.

A closed loop payment system 130 may include a wallet server 132 that communicates with a digital wallet 112 of a user device 110. The digital wallet 112 may be linked to a closed loop user account 134, which may fund payments from a sender (using the digital wallet 112) to a recipient in the closed loop payment system 130. The closed loop user account 134 may be identified by a closed loop user account identifier (which may be or include a user identifier). The recipient may include another user having another closed loop user account 134 or a merchant 120 enrolled with the closed loop payment system 130. The merchant 120 may have a closed loop merchant account 136 to receive payments in the closed loop payment system 130, such as from closed loop user accounts 134. Each merchant 120 enrolled in the closed loop payment system 130 may be assigned with a closed loop merchant identifier.

Each closed loop recipient in the closed loop payment system 130 may be provided with a digital encoding such as a QR code that encodes a recipient identifier using an encoding scheme 138, which may be specific for each closed loop payment system 130. For example, a merchant 120 may be provided with a QR code that encodes a closed loop merchant identifier. Examples of encoding schemes 138 will be described with respect to the directory database 153. A closed loop recipient (a recipient that accepts payments through a closed loop payment system 130) may provide the digital encoding to a closed loop sender (a sender that sends payments through a closed loop payment system 130). For example, a closed loop merchant may display the digital encoding or a user may share the digital encoding to another (sending) user. Because each encoding scheme 138 may be specific to each closed loop payment system 130, a digital encoding for a closed loop recipient in a first closed loop payment system 130 may not be recognized by a second closed loop payment system 130.

Each closed loop user account 134 may be assigned with an account reference number 135. The account reference number 135 may refer to an account identifier recognized by a payment network 160 for payments through the payment network 160. For example, the account reference number may include a virtual card number that may be recognized on a card network, such as the Mastercard® interchange network. In some examples, the account reference number 135 may include a minimum length of 11 and a maximum length of 19. The account reference number 135 may be used to transact payments on the payment network 160 and may be associated with an account that is funded by the closed loop user account 134.

Similarly, a closed loop merchant account 136 may be assigned with a payment network merchant identifier 137 that the payment network 160 may use to identify a closed loop merchant to which to direct payments. In particular, a recipient FI 105 may enroll with the payment network 160 to settle payments on behalf of a closed loop merchant. The recipient FI 105 may be assigned with a primary account number. Payment transactions from the payment network 160 may be directed to the primary account number and include the payment network merchant identifier 137 to which to send the payment. The recipient FI 105 may, in turn, identify the closed loop merchant account 136 and credit the payment amount (less any fees) from an account associated with the primary account number to the closed loop merchant account 136.

The closed loop merchant identifier may be encoded using an encoding scheme 138 used by the closed loop payment system 130. The encoded data (which includes the closed loop merchant identifier) may be represented as a digital encoding, such as a QR code. Each closed loop payment system 130 may use its own respective encoding scheme 138. Thus, a first closed loop payment system 130 may not recognize the encoding scheme of a second closed loop payment system 130. Examples of encoding schemes 138 will be described with respect to the directory database 153.

An open loop payment system 140 may be similar to the closed loop payment system 130 except that payments may be made from and to different payment institutions, including different banks. For example, the open loop payment system 140 may leverage payment networks 160. In these examples, the open loop payment system 140 may process card payments using cards issued by many banks as funding sources and merchant banks that participate in the payment network 160.

The wallet connector system 150 may facilitate interoperability between payment systems that would otherwise be incompatible with one another. In some examples, the wallet connector system 150 may leverage a payment network 160 to facilitate payments between incompatible payment systems.

In some examples, to facilitate interoperability between incompatible payment systems, a closed loop merchant may be assigned with a payment network merchant identifier 137. The payment network merchant identifier 137 may include the encoded data (such as QR data) for a merchant 120 and an indication that the merchant 120 is a closed loop merchant. As such, in these examples, a closed loop merchant may be identifiable by the payment network 160 so that the wallet connector system 150 may leverage the payment network 160 to facilitate payments from closed loop digital wallets of other closed loop payment systems 130 and/or from open loop digital wallets. Similarly, a closed loop digital wallet and/or its associated closed loop user account 134 may be assigned with an account reference number 135.

The wallet connector system 150 may include an Application Programming Interface (API) gateway 152, a wallet connector server 154, a rules database 151, a directory database 153, an account reference number (ARN) database 155, and/or other components. In some examples, the wallet connector system 150 may be implemented within or otherwise leverage a payment network 160 to mediate payments between senders and recipients. In some examples, the payment network 160 may operate a push payment platform in which payments may be pushed from senders to recipients over multiple delivery channels, such as payment (credit or debit) cards, bank accounts, digital wallet, cash-out locations, and/or other channels that may be reachable by the payment network 160. In these examples, the wallet connector system 150 may use, implement, or be implemented with the push payment platform to mediate payments between incompatible payment systems. An example of a push payment platform may include the Mastercard® Send™ platform.

The API gateway 152 may expose interoperability calls 156 executed by the wallet connector server 152. The interoperability calls 156 may facilitate interoperability of the payment systems. Examples of exposed interoperability calls 156 may include: (1) mapping functions that discover RI and merchant identities based on encoded data from QR codes and other digital encodings, (2) account reference number lookup and dynamic generation in response to payment requests, (3) payment requests that may initiate push payments, (4) receive requests that may permit a party such as an endpoint to retrieve payment transaction information, which may facilitate pull payments, (5) notifications that provide switching and routing services, and/or other functions to facilitate interoperability of incompatible payment systems. An example of mapping functions is described with reference to FIG. 3, an example of account reference number lookup and dynamic generation is described with respect to FIG. 4, examples of push and pull payments are respectively described with respect to FIGS. 5A and 5B, and an example of notifications is described with respect to FIG. 6. In some examples, each of the exposed interoperability calls 156 may be monitored and metered for billing purposes based on usage by the payment systems. Thus, in exchange for fees for usage of the exposed functionality, the payment systems may achieve interoperability with other payment systems.

To facilitate interoperability of the payment systems, the wallet connector system 150 may also store (and the wallet connector server 154 may access) the rules database 151, the directory database 153, and the ARN database 155. The rules database 151 may store a plurality of rules applied by the wallet connector server 154 to provide interoperability between the payment systems. For example, the plurality of rules may include a payment rule, an acceptance rule, a participation rule, and/or other rules applied by the wallet server 132. The rules may be specified by a payment system while enrolling the payment system to participate in the system 100.

A payment rule may refer to a rule that specifies whether or not a given payment system permits providing payments to other payment systems. In some examples, a payment rule may include a whitelist payment rule or a blacklist payment rule. For example, a whitelist payment rule may refer to a payment rule that specifies that a closed loop payment system 130A will permit a payment to be made to an account of a closed loop payment system 130B. On the other hand, a blacklist payment rule may refer to a payment rule that specifies that a closed loop payment system 130A will not permit a payment to be made to an account of a closed loop payment system 130B. In some examples, in the absence of a payment rule for a given payment system, a default payment rule may be used that specifies payments are permitted to be made to all other participating payment systems.

An acceptance rule may refer to a rule that specifies whether or not a given payment system permits payments to be received from other payment systems. In some examples, an acceptance rule may include a whitelist acceptance rule or a blacklist acceptance rule. For example, a whitelist acceptance rule may refer to an acceptance rule that specifies that a closed loop payment system 130A will permit a payment to be received from an account of a closed loop payment system 130B. On the other hand, a blacklist acceptance rule may refer to an acceptance rule that specifies that a closed loop payment system 130A will not permit a payment to be received from an account of a closed loop payment system 130B. In some examples, in the absence of an acceptance rule for a given payment system, a default acceptance rule may be used that specifies payments are permitted to be received from all other participating payment systems.

A participation rule may refer to a rule that specifies a level of payment processing that a given payment system agrees is to be handled by the wallet connector system 150. The level of payment processing may refer to actions taken by the wallet connector system 150 to facilitate interoperability between incompatible payment systems. For example, the level of payment processing may include clearing-and-settlement, switching-and-routing, and/or other levels of payment processing.

The directory database 153 may store a mapping between encoding schemes and payment systems. A mapping may refer to a stored association between data items such an encoding scheme and an identification of a payment system that uses the encoding scheme. In some examples, the mapping may include a network address such as a Uniform Resource Locator (URL) at which to transmit requests to the payment system to identify a recipient, such as a merchant, and validate the recipient's data encoding.

Table 1 below shows an example of the mapping stored in the directory database 153. Five payment systems and their respective encoding schemes are shown for illustration. Other numbers of payment systems may be included in the mapping. In Table 1, a sample encoding image may refer to an image, such as a picture, of a digital encoding used by the corresponding payment system. For example, the sample encoding image may include an example of a QR code used by the corresponding payment system.

| Payment System | Digital Encoding | Encoding Data | Encoding Scheme |
| --- | --- | --- | --- |
| First payment system | Sample encoding image for first payment system | https(://)example(.)com(/) ABC123XYZ | URL identifying payment system |
| Second payment system | Sample encoding image for second payment system | 281005050101PDLS2HJ43MF8 | Text identifying payment system |
| Third payment system | Sample encoding image for third payment system | 0002com(.)name0140 https(://)example(.)com | Text with embedded URL identifying payment system |
| Fourth payment system | Sample encoding image for fourth payment system | resource-name(://) com(.)example(?)variables | Text with embedded Uniform Resource Indicator (URI) identifying payment system |
| Fifth payment system | Sample encoding image for fifth payment system | BEGIN:CODE FN: identifying information END:CODE | Structured Text identifying payment system |

Other data may be stored in the mapping as well. For example, the mapping between encoding schemes and payment systems may further include an association with a receiving institution 101 and/or a recipient FI 105 that is to receive a payment on behalf of a recipient, such as a user, merchant, or other beneficiary of a payment. Based on the encoding scheme of each payment system, the wallet connector server 154 may identify a payment system (and corresponding receiving institution 101) that is associated with a given data encoding that uses the encoding scheme. For example, the wallet connector server 154 may parse encoded data according to an encoding scheme to identify the corresponding payment system. In particular, referring to the encoding scheme for the first payment system illustrated in Table 1, the wallet connector server 154 may receive encoded data that includes text having a URL. The wallet connector server 154 may parse the URL in the encoded data to match the parsed URL with a URL of an encoding scheme in the mapping, thereby identifying the first payment system that uses the encoded data to identify a recipient. Other encoding schemes may be similarly used to parse and compare encoded data.

In some examples, the directory database 153 may store a mapping between a closed loop merchant identifier associated with a closed loop merchant account identifier with the payment network merchant identifier 137 recognized by the payment network 160. In this manner, the wallet connect server 154 may identify a payment network merchant identifier 137 based on a closed loop merchant account identifier and vice versa. In some examples, the mapping may include other data, such as a network address such as a URL for encoding schemes that do not have an express network address to which to contact a receiving institution of the payment system.

The ARN database 155 may store a mapping between an account reference number 135 and a closed loop user account identifier that identifies a closed loop user account 134. In this manner, the wallet connector server 154 may identify an account reference number 135 based on a closed loop user account identifier and vice versa.

Figure 2:
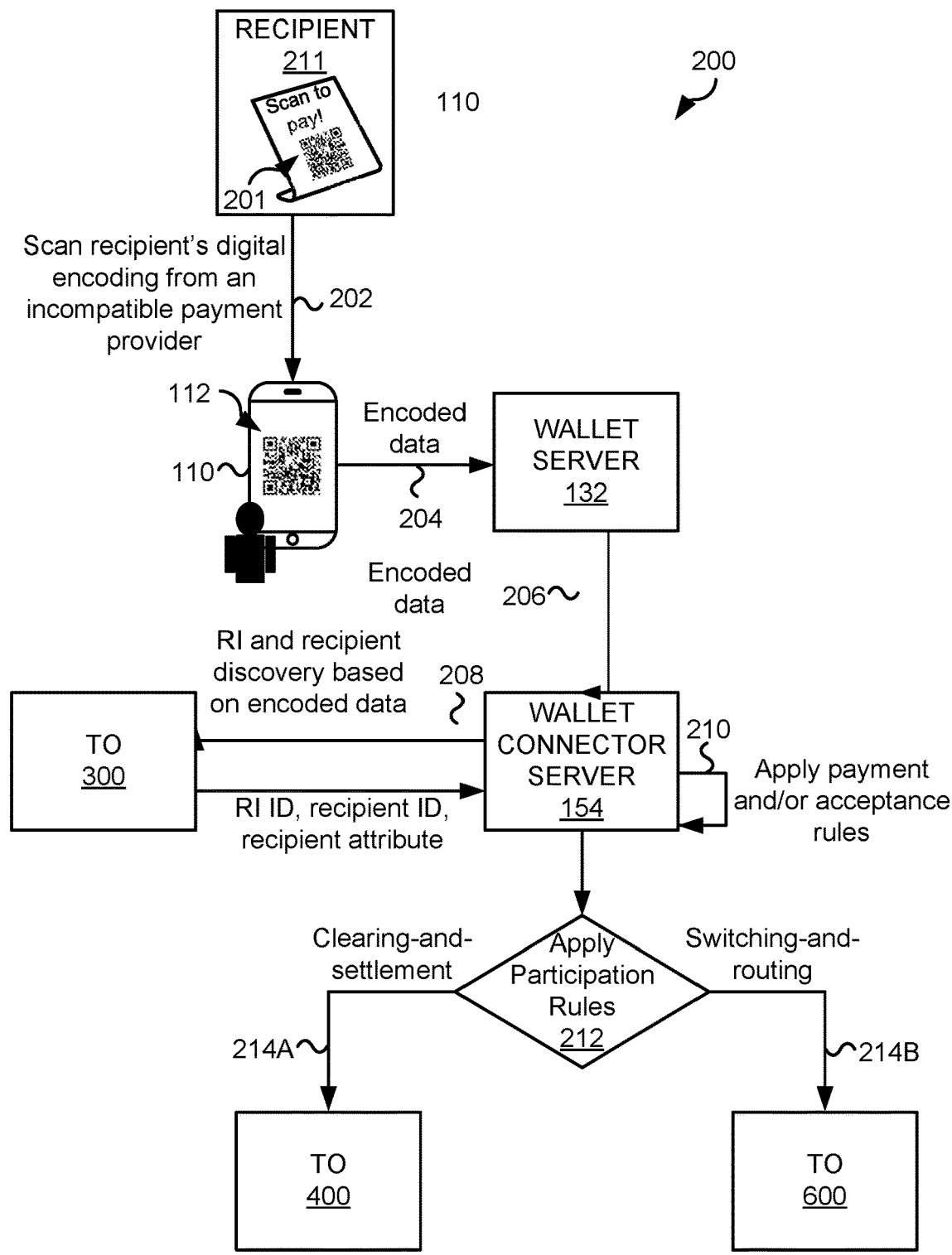
FIG. 2 illustrates a data flow diagram of an example of a wallet connector server providing interoperability between incompatible payment systems.

Having described an overview of various system components, attention will now turn to an example operation of the wallet connector server 154. For example, FIG. 2 illustrates a data flow diagram 200 of an example of the wallet connector server 154 providing interoperability between incompatible payment systems. The wallet connector server 154 may mediate the transaction to provide interoperability between a payment system of a sender and a payment system of a recipient. In the illustrated example, a recipient 211 may accept payment through a payment system that is incompatible with a payment system associated with a digital wallet 112 of a user device 110. The recipient 211 may include a merchant 120 or another user that also has a digital wallet 112. For example, the sender may include a closed loop sender and the recipient may be a closed loop recipient. In another example, the sender may include a closed loop sender and the recipient may be an open loop recipient. In another example, the sender may include an open loop sender and the recipient may be an open loop recipient. In yet another example, the sender may include an open loop sender and the recipient may be an open loop recipient.

In the examples that follow, the recipient 211 will be described as a closed loop merchant and the sender will be described as a consumer using a closed loop digital wallet to make a purchase from the closed loop merchant. As illustrated, the recipient 211 may display a digital encoding 201 such as a QR code, a text version of data encoded by the digital encoding 201, and/or other data. The display may include an electronic display or a physical display on which the digital encoding 201 is printed. The digital encoding 201 may encode data that includes a recipient identifier, such as a closed loop merchant identifier. The encoded data may be in a format using an encoding scheme 138 used by a payment system with which the recipient 211 is enrolled. Examples of data encodings and encoding schemes are provided with respect to the directory database 153.

At 202, the digital wallet 112 may scan the digital encoding 201 and obtain a payment amount to be made to the recipient 211. For example, at the direction of the consumer, the digital wallet 112 may take a photograph of the digital encoding 201. The consumer may input the payment amount into the digital wallet 112. In some examples, if the digital encoding 201 cannot be scanned, the digital wallet 112 may also receive an input from the consumer that specifies the close loop merchant identifier, which may be read by the consumer from the merchant's display. The digital wallet 112 may decode the digital encoding 201 to obtain the encoded data. Such decoding may use QR or other decoding techniques depending on the type of the digital encoding 201 that is used.

At 204, the digital wallet 112 may transmit the encoded data, the payment amount, and the user identifying information to the wallet server 132. The wallet server 132 may not recognize the encoding scheme used by the encoded data because, in this example, the recipient 211 may use a payment system that is incompatible with the payment system associated with the wallet server 132.

At 206, the wallet server 132 may transmit the encoded data, the payment amount, sender identifying identification (such as a closed loop user account identifier), and/or other data to the wallet connector server 154 of wallet connector system 150. In some examples, instead of or in addition to the closed loop user account identifier, the transaction payload may further include the account reference number 135 generated for the closed loop user account 134 identified by the closed loop user account identifier.

At 208, the wallet connector server 154 may perform RI and recipient discovery based on the encoded data, the result of which may be an identification of a receiving institution 101 of the payment system, the closed loop merchant identifier, and a merchant attribute. The merchant attribute may include a name of the merchant, a type of merchant, and/or other description of the recipient 211. An example of RI and recipient discovery is described with respect to method 300 illustrated in FIG. 3.

At 210, the wallet connector server 154 may access and apply payment and acceptance rules from the rules database 151 to determine whether the payment systems involved in the payment transaction permit payment transactions from one another. For example, the wallet connector server 154 may access payment rules of the user's payment system to determine whether the user's payment system permits payments to be made to the recipient's 211 payment system and/or may access acceptance rules of the recipient's 211 payment system to determine whether the recipient's 211 payment system permits payments to be accepted from the user's payment system.

At 212, upon a determination that the payment transaction is permitted based on the applied payment and acceptance rules, the wallet connector server 154 may apply participation rules to determine how to process the payment transaction. For example, the wallet connector server 154 may access and apply payment and acceptance rules from the rules database 151. For example, the wallet connector server 154 may access a participation rule pertaining to the user's payment system and/or the recipient's 211 payment system from the rules database 151. Based on the applied participation rule, the wallet connector server 154 may process the payment transaction via either clearing-and-settlement (214A) or switching-and-routing (214B). An example of clearing-and-settlement is described with respect to the method 400 illustrated at FIG. 4. An example of switching-and-routing is described with respect to the method 600 illustrated at FIG. 6.

Figure 3:
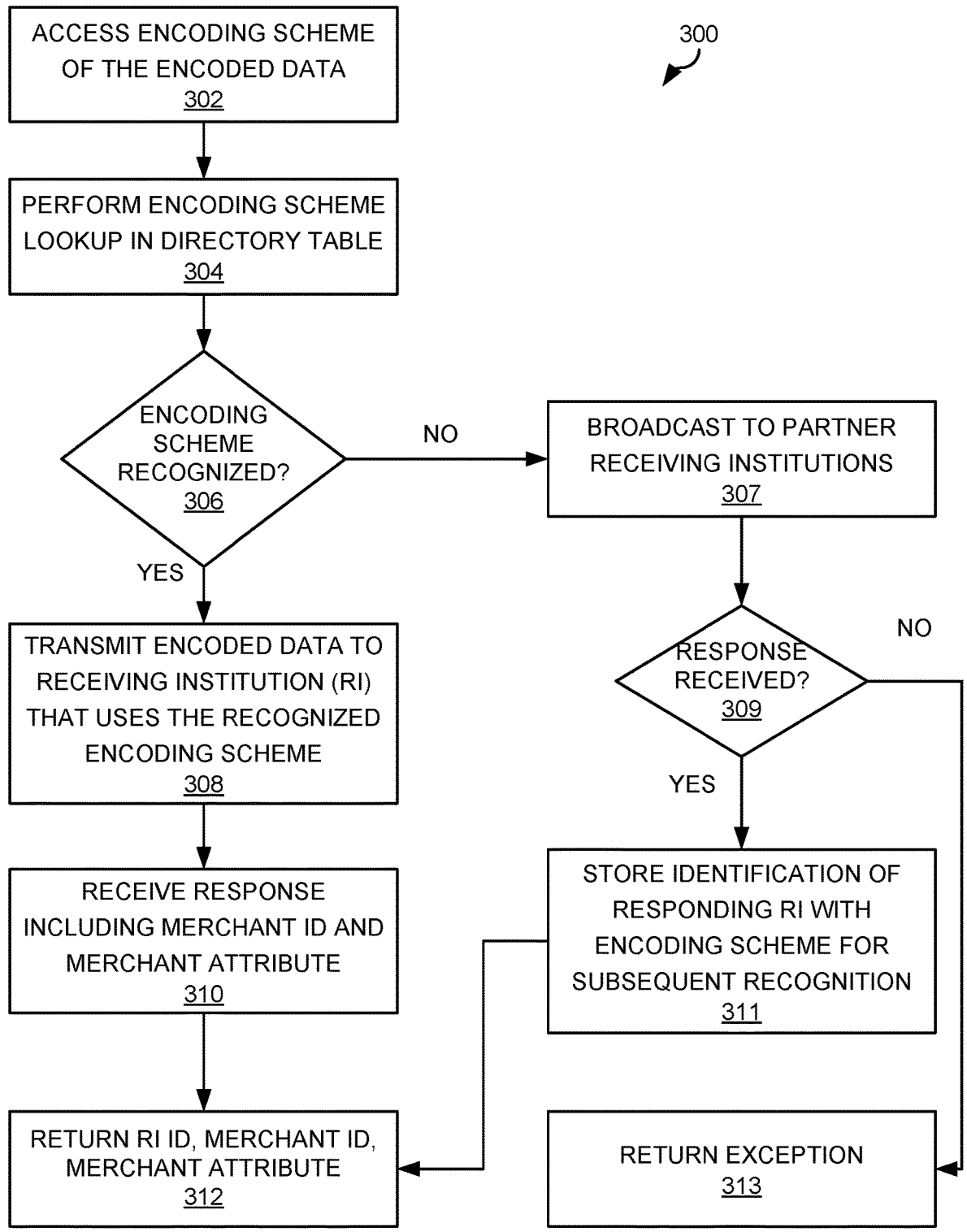
FIG. 3 illustrates a flow diagram of an example method of performing recipient institution (RI) and recipient discovery based on encoded data from a digital encoding of the recipient, such as a merchant.

FIG. 3 illustrates a flow diagram of an example method 300 of performing RI and recipient discovery based on encoded data from a digital encoding 201 of a recipient, such as a merchant 120.

At 302, the method 300 may include accessing an encoding scheme (such as an encoding scheme 138) of the encoded data. For example, the method 300 may include accessing a format of the encoded data and identifying an encoding scheme based on the format. The format may include ASCII text in which case the method 300 may include identifying a URL or other network address to a receiving institution along with a merchant identifier encoded in the URL. In another example, the format may include hexadecimal values. Other types of encoding schemes may be used as well.

At 304, the method 300 may include performing an encoding scheme lookup in the directory database 153. In some examples, the lookup may include using regular expressions to recognize ASCII text (such as regular expressions on the URL of the encoded data to match with encoding schemes in the directory database 153). In some examples, the lookup may include decoding hexadecimal values to match decoded values with the encoding schemes in the directory database 153.

At 306, the method 300 may include determining whether the encoding scheme is recognized, such as based on the encoding scheme lookup. For example, the encoding scheme may be recognized when an entry in the directory database 153 matches the encoding scheme of the encoded data from the digital encoding 201. Such entry may include an RI identifier for an RI of the payment system that uses the encoding scheme. The identification may further include a network address at which to contact the RI (if such network address is not encoded by the encoded data).

At 308, responsive to determining that the encoding scheme is recognized, the method 300 may include transmitting the encoded data to the receiving institution 101 that uses the recognized encoding scheme. For example, the method 300 may include transmitting the encoded data to the URL or other network address of the identified receiving institution 101. The receiving institution 101 may receive the transmission and obtain a closed loop merchant identifier based on the encoded data and a merchant attribute based on the closed loop merchant identifier.

At 310, the method 300 may include receiving a response from the receiving institution 101. The response may include the closed loop merchant identifier and the merchant attribute. In some examples, the response may include a payment network merchant identifier 137 or the method 300 may include identifying the payment network merchant identifier 137 based on a lookup of the directory database 153.

At 312, the method 300 may include returning (as a result of the method) the identifier of the receiving institution 101, the closed loop merchant identifier (and/or the payment network merchant identifier 137), and the merchant attribute.

Returning now to 306, responsive to determining that the encoding scheme is not recognized, which may occur because the encoding scheme is not in the directory database 153, the method 300 may proceed to 307. An encoding scheme used by a receiving institution 101 may not be included in the directory database 153 for various reasons, such as when a receiving institution 101 uses a new encoding scheme without providing an update to the directory database 153, when a partner payment system acquires another payment system previously unknown to the wallet connector system 150, and/or for other reasons. At 307, the method 300 may include broadcasting the encoded data to partner receiving institutions 101 of payment systems that have enrolled to use the wallet connector system 150. The method 300 may include broadcast the encoding scheme and/or encoding data to the partner receiving institutions 101 serially by contacting each partner receiving institutions 101 one by one to determine whether a response acknowledging recognition of the encoded data and/or parallel techniques such as a multi-cast protocol.

At 309, the method 300 may include determining whether a response was received from any of the partner receiving institutions 101. If not, the method 300 may return an exception at 313. If yes, any response may include data similar to the response described at block 310. Namely, the response may include the merchant identifier and merchant attribute. In some examples, the response may include an identifier of the receiving institution 101.

At 311, responsive to receiving a response from a partner receiving institution 101, the method 300 may include storing the identifier of the responding receiving institution 101 in association with the encoding scheme in the directory database 153 for subsequent recognition. In these examples, the method 300 may dynamically learn new encoding schemes used by partner receiving institutions 101. The method 300 may proceed to block 312.

Figure 4:
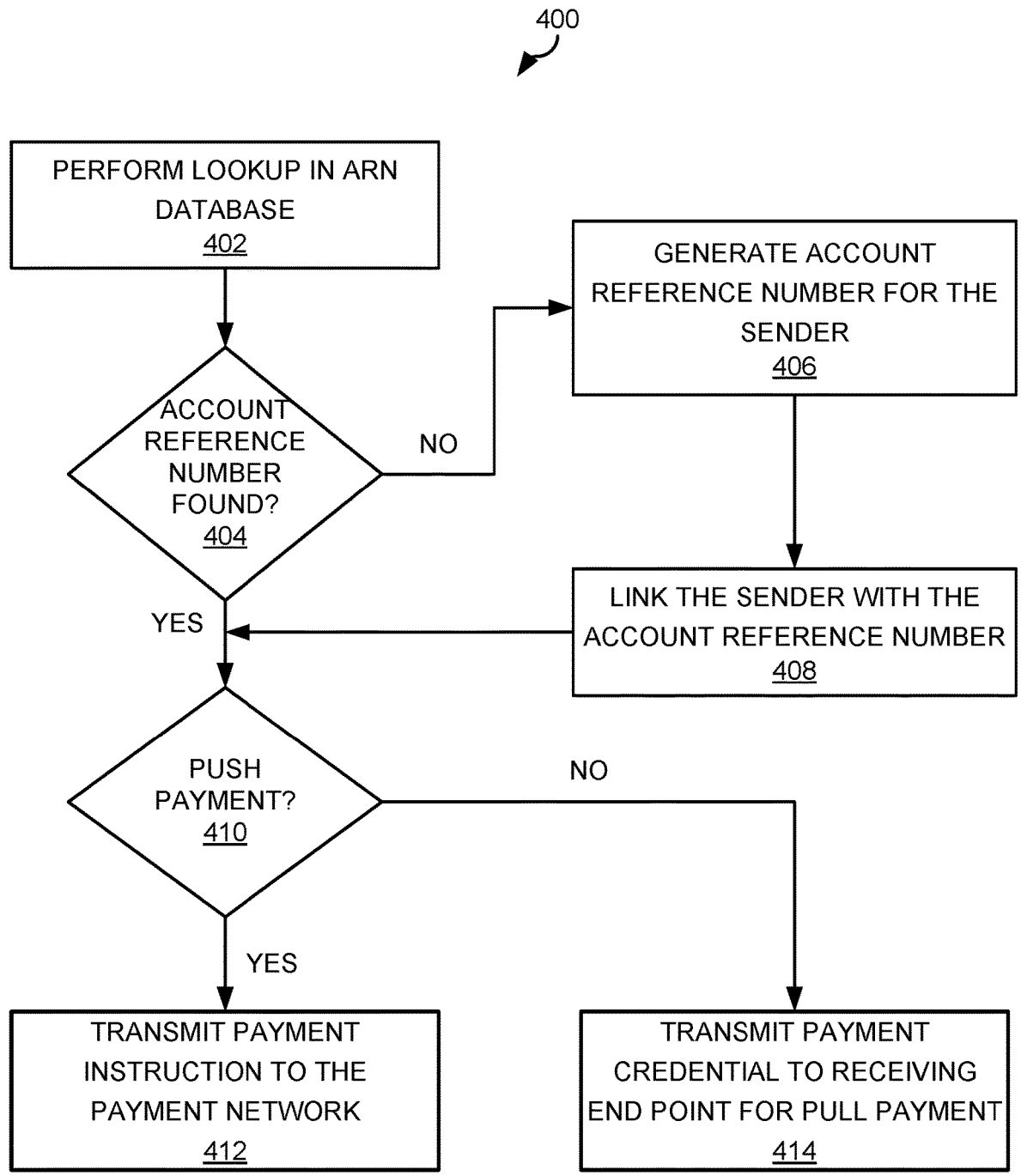
FIG. 4 illustrates a flow diagram of an example method of facilitating payments based on clearing-and-settlement.

FIG. 4 illustrates a flow diagram of an example method 400 of facilitating payments based on clearing-and-settlement.

At 402, the method 400 may include performing a lookup of the user identifying information (such as the closed loop user account identifier described at block 206 of FIG. 2) in the ARN database 155. The ARN database 155 may store an account reference number 135 mapped to a closed loop user account 134 if the closed loop user account 134 has been assigned with the account reference number 135.

At 404, the method 400 may include determining whether account reference number 135 has been found in the ARN database 155 for the closed loop user account 134 based on the lookup.

At 406, responsive to determining that the account reference number 135 has not been found, the method 400 may include generating an account reference number 135 for the closed loop user account 134 (the sender). In some examples, the method 400 may further include generating, for the account reference number 135, credential information such as an expiration date, and/or other information used by a payment network 160 to validate payment cards.

At 408, the method 400 may include linking the closed loop user account 134 with the account reference number 135 (including any credential information) in the ARN database 155. For example, the method 400 may include storing the closed loop user account identifier that identifies the closed loop user account 134 in association with the account reference number 135 in the ARN database 155.

At 410, the method 400 may include determining whether a push payment is to be made. For example, the participation rules or other rules may indicate whether the payment system for the user initiates push payments or pull payments. Responsive to determining that a push payment is to be made, at 412, the method 400 may include transmitting a push payment to the payment network 160 via a push platform used by the wallet connector system 150. The payment initiation request may include the account reference number 135, payment amount, the payment network merchant identifier 137, and/or other payment information used by the payment network 160. An example of payment processing by the payment network 160 is illustrated with respect to FIG. 5A.

Returning to 410, if a push payment is not to be made, at 414, the method 400 may include transmitting a payment credential to a receiving end point, such as the PSP or payment gateway 107, which may initiate a pull payment through the payment network 160 using the payment credential. The payment credential may include the account reference number 135, credential information such as an expiration date associated with the account reference number 135, and/or other information used by the payment network 160 to validate a payment credential. An example of pull payment is illustrated with respect to FIG. 5B.

Figure 5A:
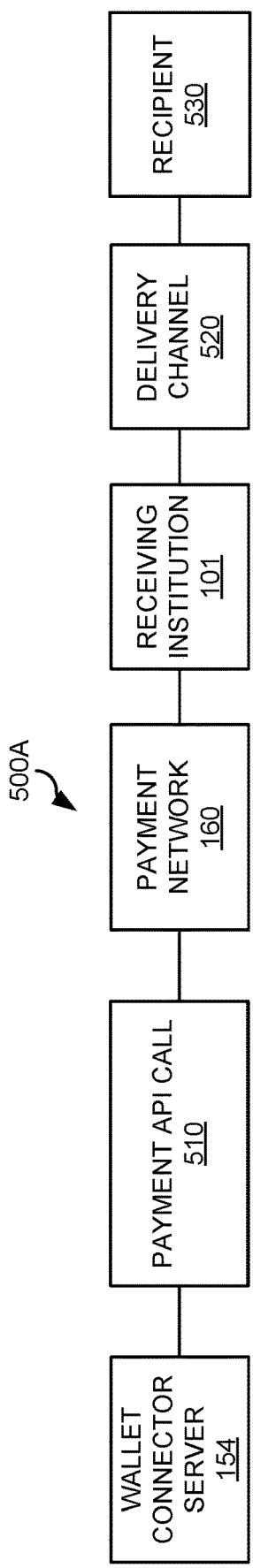
FIG. 5A illustrates a data flow diagram of an example of pushing payments to a recipient via the payment network.

FIG. 5A illustrates a data flow diagram 500A of an example of pushing payments to a recipient via the payment network 160. In the illustrated example, the wallet connector server 154 may leverage or include a push payment platform. The push payment platform may send payments originating from a sender to a recipient in a global network. An example of a push payment platform is the Mastercard® Send™ platform, although other push payment techniques or platforms may be used. The push platform may provide various API calls such as a payment API call 510. Generally speaking, a transaction originator (illustrated in FIG. 5A as the wallet connector server 154 acting as the transaction originator) may transmit a payment instruction to the payment network 160 via the send API call. The payment instruction may include an identification of a sender account (such as the account reference number 135 of a closed loop sender), an identification of a recipient 530 (such as a payment network merchant identifier 137), a payment amount, credential information, and/or other information. The credential information may include security information such as an expiration date, a Card Verification Value (CCV), and/or other credential information. The sender account may include various payment instrument accounts such as a bank account, a payment card (such as a credit or debit card) account, a digital wallet account, and/or other types of fund accounts. Thus, although examples described herein may refer to a payment card or account reference number, other forms of funding sources may be used as well.

The payment network 160 may identify a receiving institution 101 responsible for receiving payments on behalf of the recipient 530. The payment network 160 may route a payment transaction to the identified receiving institution 101 on behalf of the originating institution. The receiving institution 101 may receive the payment transaction, identify a delivery channel 520 used by the recipient 530 to receive funds, and post the payment amount to the delivery channel 520. Depending on availability, the delivery channel 520 may include a bank account, debit or prepaid payment card account, a digital wallet, a cash-out location, and/or other channel at which the recipient 236 may receive funds.

The recipient institution 101 may provide the payment network 160 with a verification response indicating that the payment amount has been posted, and the payment network 160 may route an indication to the originating institution that the payment has been posted.

In some examples, the wallet connector server 154 may mediate payments from a sender account of a first payment system (such as a closed loop user account 134) to a recipient account of a second payment system (such as a closed loop merchant account 136) via the payment API call 510. For example, the wallet connector server 154 may execute the payment API call 510 that specifies that the account reference number 135 generated for the closed loop user account 134 is to be used as the sender account and the payment network merchant identifier 137 is to be used to identify the appropriate recipient institution 101 and recipient account.

Figure 5B:
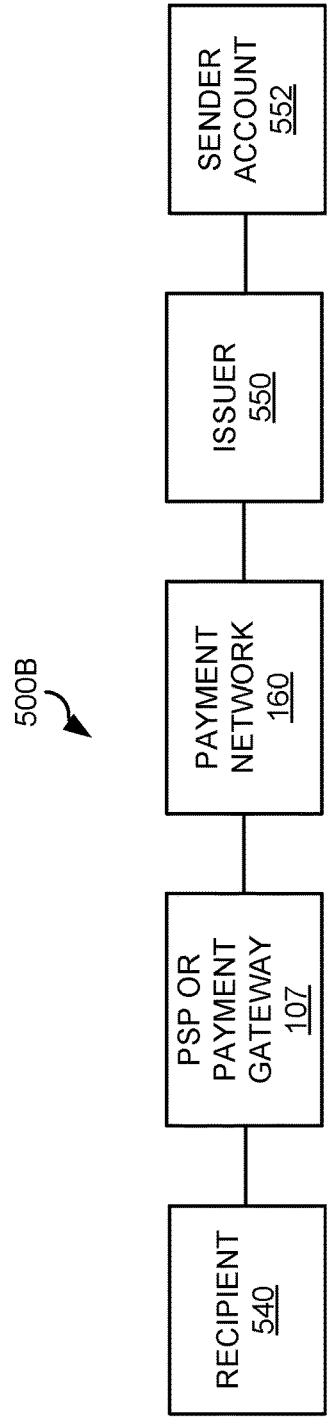
FIG. 5B illustrates a data flow diagram of an example of pulling payments from a sender via the payment network.

FIG. 5B illustrates a data flow diagram 500B of an example of pulling payments from a sender via the payment network 160. A PSP or payment gateway 107 may initiate a pull payment through the payment network 160. If mediated by the wallet connector server 154, the wallet connector server 154 may provide payment credentials including the account reference number 135 generated for the closed loop sender account to the PSP or payment gateway 107, which may process payments on behalf of a recipient 540 such as a closed loop merchant. The payment network 160 may forward the pull payment request to an issuer 550, which may check the funds of and debit a sender account 552 identified by the account reference number 135. In this example, the issuer 550 may be the sender FI 103.

Figure 6:
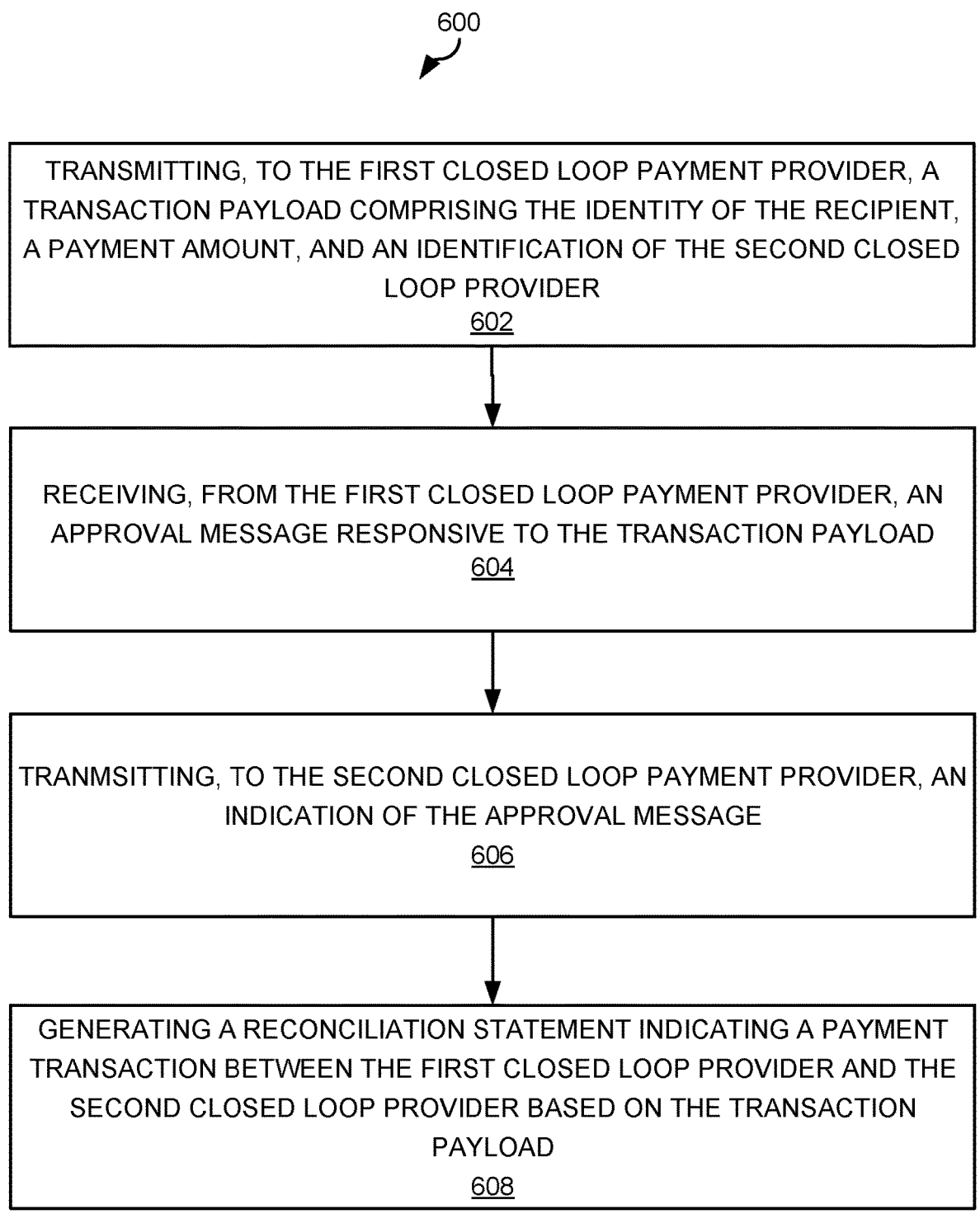
FIG. 6 illustrates a flow diagram of an example method of facilitating payments based on switching-and-routing.

FIG. 6 illustrates a flow diagram of an example method 600 of facilitating payments based on switching-and-routing. At 602, the method 600 may include transmitting, to the first closed loop payment system, a transaction payload based on an identity of the recipient, a payment amount, and an identification of the second closed loop payment system. At 604, the method 600 may include receiving, from the first closed loop payment system, an approval message responsive to the transaction payload. At 606, the method 600 may include transmitting, to the second closed loop payment system, an indication of the approval message. At 608, the method 600 may include generating a reconciliation statement indicating a payment transaction between the first closed loop payment system and the second closed loop payment system based on the transaction payload.

Figure 7:
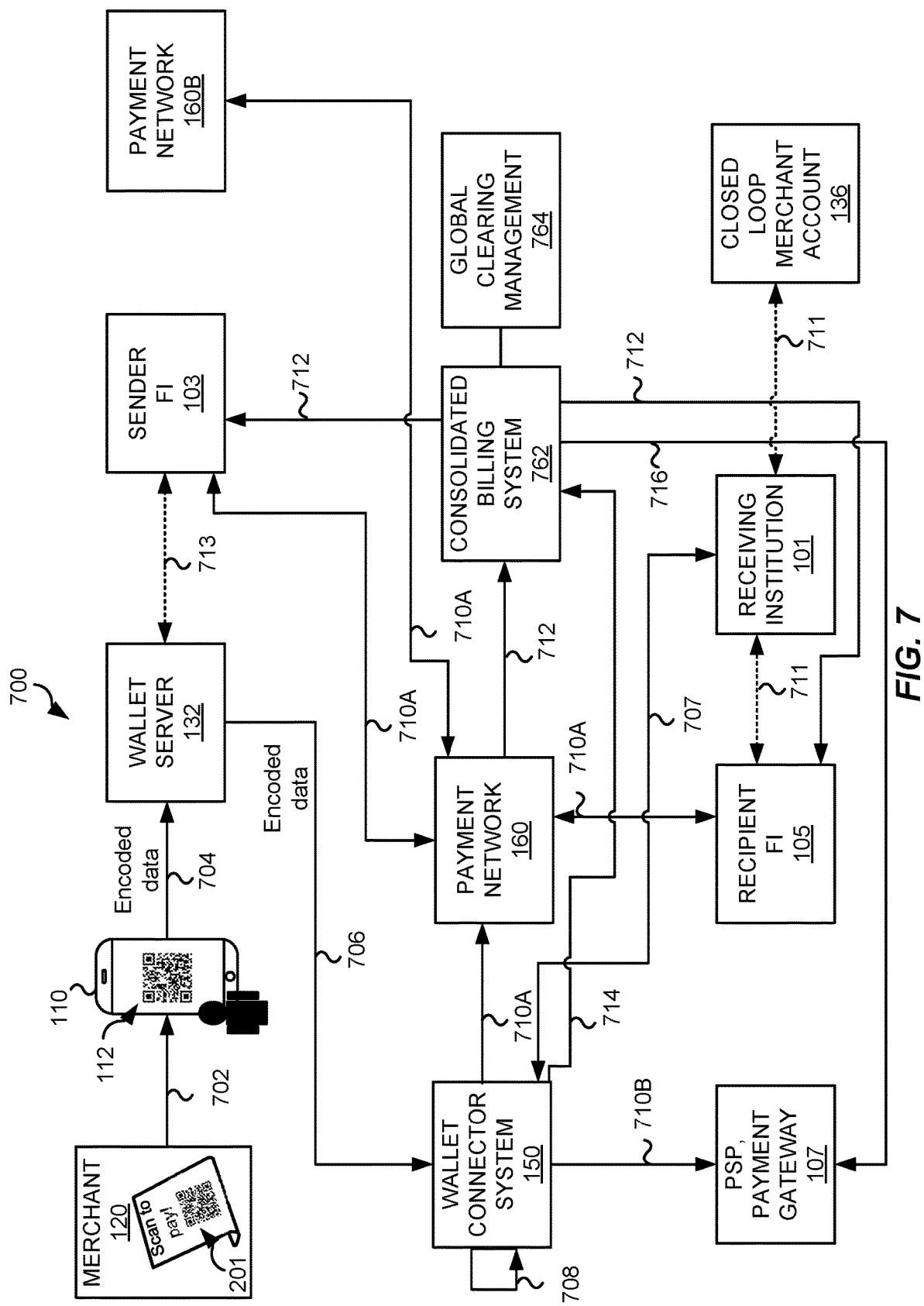
FIG. 7 illustrates a data flow diagram of an example of processing a payment between incompatible payment systems.

FIG. 7 illustrates a data flow diagram 700 of an example of processing a payment between incompatible payment systems.

At 702, the digital wallet 112 may scan the digital encoding 201 and obtain a payment amount to be made to the merchant 120. For example, at the direction of a user, the digital wallet 112 may take a photograph of the digital encoding 201 and receive from, the user, the payment amount. The digital wallet 112 may read the digital encoding 201 to obtain the encoded data. Such decoding may use QR or other decoding techniques depending on the type of the digital encoding 201 that is used.

At 704, the digital wallet 112 may transmit the encoded data, the payment amount, and the user identifying information to the wallet server 132. The wallet server 132 may not recognize the encoding scheme used by the encoded data because, in this example, the merchant 120 may use a payment system that is incompatible with the payment system associated with the wallet server 132. The wallet server 132 may attempt and fail to identify the merchant 120 from the encoded data. The wallet server 132 may then forward the encoded data, the payment amount, the user identifying information, and/or other data to the wallet connector system 150.

At 706, the wallet connector system 150 may receive encoded data from the wallet server 132. In some examples, the wallet connector system 150 may further receive a payment amount and the identifying information associated with the digital wallet 112, and/or other data.

At 707, the wallet connector system 150 may perform RI and recipient discovery based on the encoded data such as by implementing the method 300 illustrated in FIG. 3. The wallet connector system 150 may receive, from the receiving institution 101 identified from the RI and recipient discovery, a payment network merchant identifier 137. The wallet connector system 150 may also identify a primary account number to which to send the payment. At 708, the wallet connector system 150 may further identify or generate payment credentials of the sender. For example, the payment credentials may include the account reference number 135.

At arrows illustrated as 710A, for push payments, the wallet connector system 150 may mediate payment through the payment network 160. For example, the wallet connector system 150 may provide the wallet server 132 or sender FI 103 with the payment network merchant identifier 137 and merchant attribute. The sender FI 103 may fund an account of the account reference number 135 from the closed loop user account 134 (indicated by arrows 713). The wallet server 132 or sender FI 103 may use the API gateway 152 to make a payment API call to initiate payment to the merchant 120. The payment API call may include the payment amount, the payment network merchant identifier, the merchant attribute, sender identifying information (such as the account reference number 135), and/or other payment details. In some examples, the wallet connector system 150 may generate the API call on behalf of the wallet server 132.

Responsive to the payment API call, the wallet connector system 150 may cause funds to be credited to the closed loop merchant account 136 in the second closed loop payment system 130. For example, the wallet connector system may cause the funds to be credited based on a receive API call or a payment instruction to the payment network 160. The receive API call may cause the recipient FI 105 to receive the funds from the payment API call to an account held at the recipient FI 105, which, at arrows indicated by 711, may then credit the closed loop merchant account 136 in the second closed loop payment system 130.

The payment instruction may initiate a traditional payment card transaction, in which the account reference number is substituted for a payment card number and processed by the payment network as a payment card transaction that credits a merchant with the payment amount. For example, the wallet connector system 150 may transmit a payment instruction to the payment network 160 to be processed as a traditional payment card transaction, in which the account reference number 135 is substituted for a payment card number and processed by the payment network as a payment card a payment card transaction that credits the merchant 120 (identified by the payment network merchant identifier 137) with the payment amount. The payment network 160 may route payment to the primary account number identifying the recipient FI 105.

In some examples, if the sender's payment account is an actual payment card account of another payment network 160B, then the payment network 160 may transmit the payment instruction to the payment network 160B via a bridged connection such as hosted by the Mastercard® BANKNET network.

At 710B, for pull payments, the wallet connector system 150 may transmit a payment credential (such as the account reference number 135) to a receiving endpoint acting on behalf of the merchant 120, such as a PSP or payment gateway 107, to pull the payment, such as by transmitting the payment instruction to the payment network to be processed as a traditional payment card transaction on the payment network 160.

At 712, the payment network 160 may settle the transaction with the recipient FI 105 and the sender FI 103 based on traditional billing and settlement by a consolidated billing system 762 and global clearing management 764 of the payment network 130.

At 714, billing and transaction detail may be generated for billing partners that used the payment. For example, the billing and transaction detail may include uses of API calls for identifying receiving institutions 101, generating or lookup up an account reference number 135, and submitting payment instructions so that each of these may be billed to the initiating party.

At 716, the billing and transaction detail report may be transmitted to a partner endpoint, such as the PSP or payment gateway 107 and to accompany the transaction detail report.

In some examples, a closed loop sender's closed loop user account 134 may be assigned with an account reference number 135, which may refer to an account identifier that is recognized by one or more of the payment networks 160 and is issued for a closed loop account. For example, the account reference number may include a payment card number (such as a credit card number or debit card number) recognized by the payment network 160. Payments may be made to or from an account reference number, which may be linked to, such as stored in association with, the closed loop account. Thus, a payment network 160 may facilitate payments to or from the closed loop account via a corresponding account reference number. The account reference number may be issued in various ways.

In some examples, the wallet connector server 154 may issue the account reference number. In some of these examples, the wallet connector server 154 may issue the account reference number dynamically in response to the request from the wallet server 132 and in response to determining that the digital wallet 112 is not associated with an account identifier recognized by the payment networks 160.

In some examples, the payment system may issue the account reference number. In these examples, the payment system may be assigned with an identifying number that may serve as a prefix for account numbers on a payment network 160. For example, the payment system may be assigned with a Bank Identification Number (BIN) from the payment network 160 to issue account reference numbers that start with the BIN.

Figure 8:
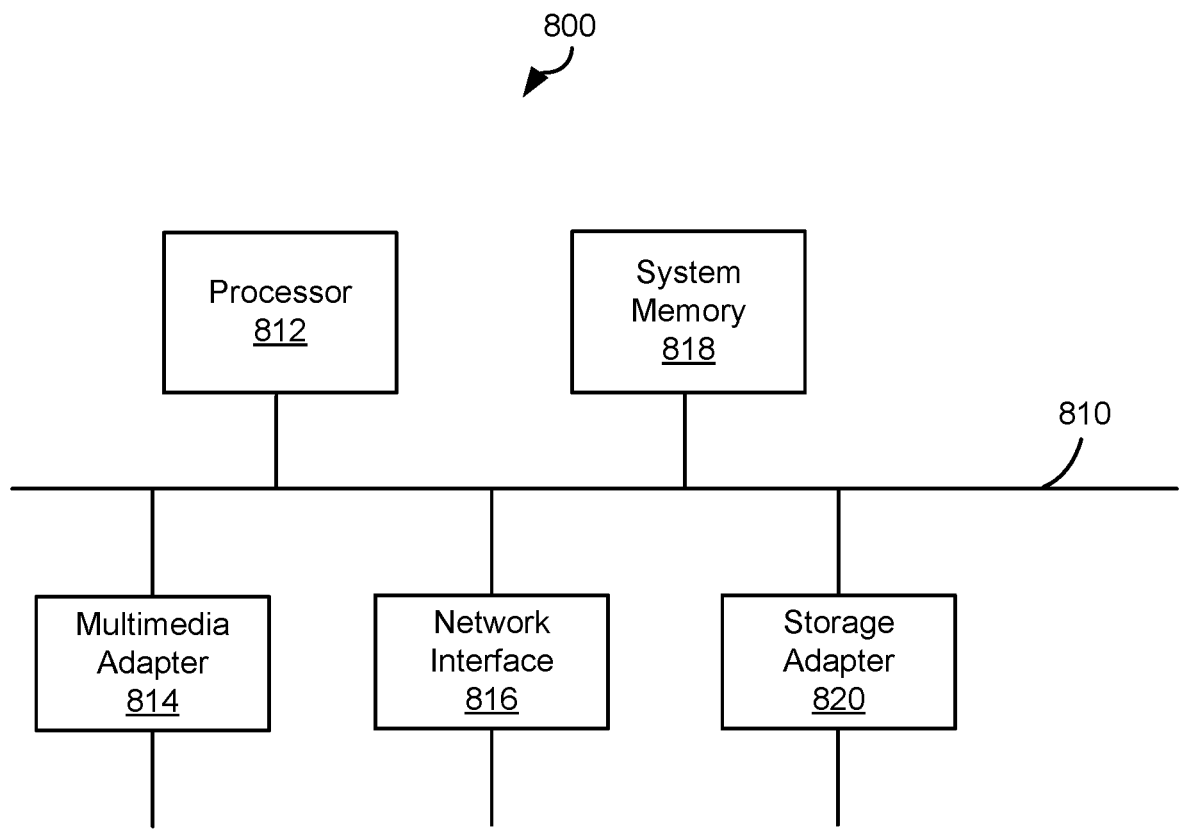
FIG. 8 illustrates an example of a computer system that may be implemented by devices illustrated in FIG. 1.

FIG. 8 illustrates an example of a computer system 800 that may be implemented by devices illustrated in FIG. 1. The computer system 800 may be part of or include the system 100 to perform the functions and features described herein. For example, various ones of the devices of system 100 may be implemented based on some or all of the computer system 800. For example, the user device 110, the wallet server 132, the wallet connector server 154, and devices of the receiving institution 101, sender FI 103, recipient FI 105, and PSP or payment gateway 107 may implement some or all of the computer system 800.

The computer system 800 may include, among other things, an interconnect 810, a processor 812, a multimedia adapter 814, a network interface 816, a system memory 818, and a storage adapter 820.

The interconnect 810 may interconnect various subsystems, elements, and/or components of the computer system 800. As shown, the interconnect 810 may be an abstraction that may represent any one or more separate physical buses, point-to-point connections, or both, connected by appropriate bridges, adapters, or controllers. In some examples, the interconnect 810 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1384 bus, or "firewire," or other similar interconnection element.

In some examples, the interconnect 810 may allow data communication between the processor 812 and system memory 818, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 812 may control operations of the computer system 800. In some examples, the processor 812 may do so by executing instructions such as software or firmware stored in system memory 818 or other data via the storage adapter 820. In some examples, the processor 812 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 814 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 816 may provide the computer system 800 with an ability to communicate with a variety of remove devices over a network such as the communication network 109 illustrated in FIG. 1. The network interface 816 may include, for example, an Ethernet adapter, a Fibre Channel adapter, and/or other wired- or wireless-enabled adapter. The network interface 816 may provide a direct or indirect connection from one network element to another, and facilitate communication and between various network elements.

The storage adapter 820 may connect to a standard computer readable medium for storage and/or retrieval of information, such as a fixed disk drive (internal or external).

Other devices, components, elements, or subsystems (not illustrated) may be connected in a similar manner to the interconnect 810 or via a network such as the communication network 109. The devices and subsystems can be interconnected in different ways from that shown in FIG. 8. Instructions to implement various examples and implementations described herein may be stored in computer-readable storage media such as one or more of system memory 818 or other storage. Instructions to implement the present disclosure may also be received via one or more interfaces and stored in memory. The operating system provided on computer system 800 may be MS-DOS®, MS-WINDOWS®, OS/2®, OS X®, IOS®, ANDROID®, UNIX®, Linux®, or another operating system.

Figure 9:
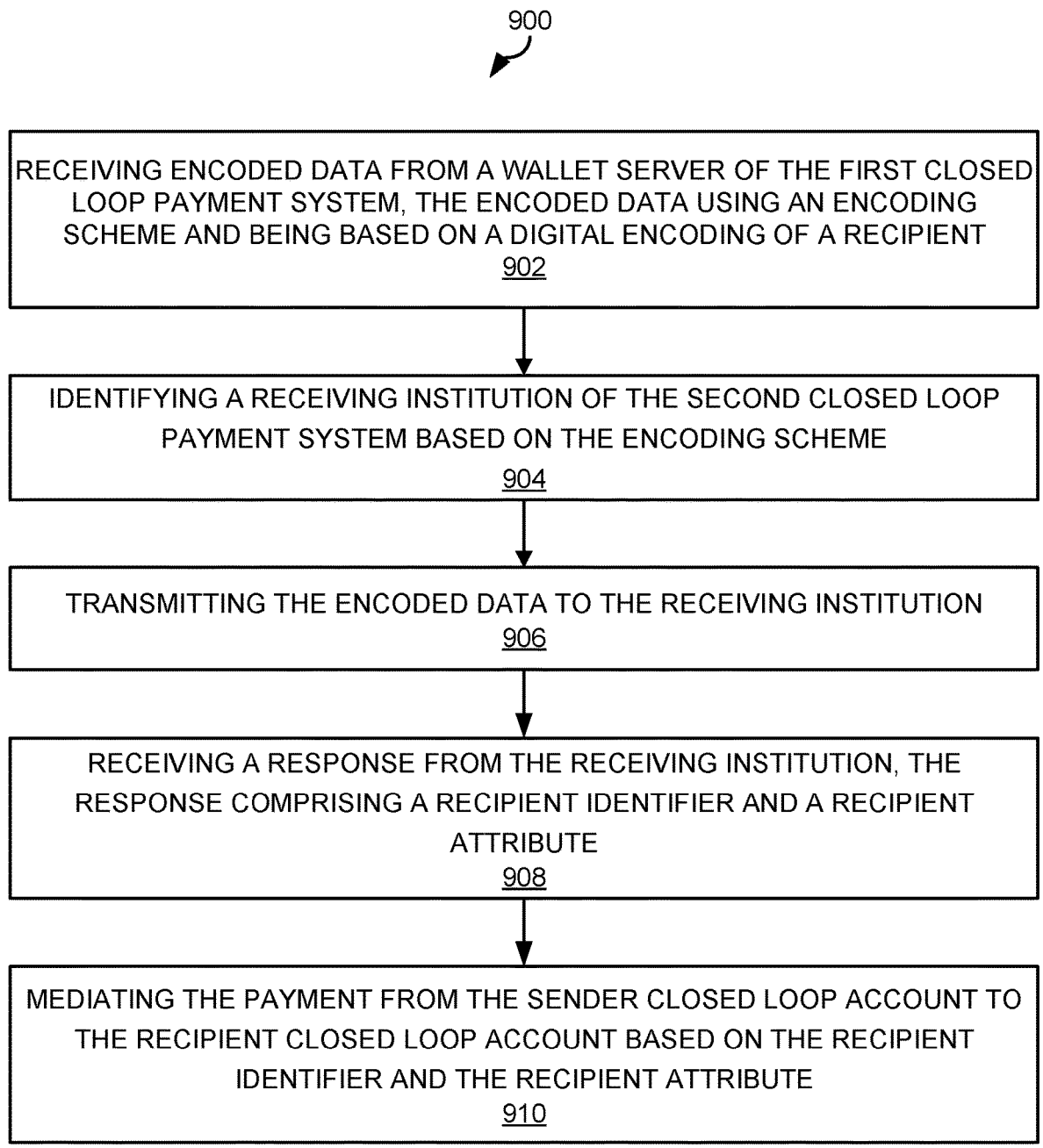
FIG. 9 illustrates an example of a method of facilitating payments between incompatible closed loop payment systems.

FIG. 9 illustrates an example of a method 900 of facilitating payments between incompatible closed loop payment systems. The method 900 may be implemented by a computer system 800 to mediate payment from a sender that has an account at a first closed loop payment system to a recipient at a second closed loop payment system that is incompatible with the first closed loop payment system. In particular, the method 900 may be implemented by the wallet connector server 154 in the wallet connector system 150. In an example, the sender may include a consumer that uses a digital wallet to make a purchase from a recipient such as a merchant. Payments may be mediated between other examples of senders and recipients as well.

At 902, the method 900 may include receiving encoded data from a wallet server (such as wallet server 132) of the first closed loop payment system (such as a closed loop payment system 130A), the encoded data using an encoding scheme (such as an encoding scheme 138) and being based on a digital encoding (such as digital encoding 201) of a recipient (such as merchant 120 or another user). For example, a digital wallet (such as digital wallet 112) of a sender may have read the digital encoding of the recipient.

At 904, the method 900 may include identifying a receiving institution (such as the receiving institution 101) of the second closed loop payment system (such as a closed loop payment system 130B) based on the encoding scheme.

In some examples, identifying the receiving institution may include accessing a directory database (such as directory database 153) that stores a plurality of encoding schemes. Each encoding scheme of the plurality of encoding schemes may be mapped to a respective one of a plurality of receiving institutions. Thus, the directory database may be used to identify encoding schemes used by receiving institutions of payment systems, including the second closed payment system.

For example, the method 900 may include performing a lookup based on the directory database and the encoding scheme to identify the receiving institution to which to transmit the encoded data. In some examples, the lookup may include parsing the encoding scheme to identify matching text with entries in the directory database. In some of these examples, the parsing may include identifying a URL or other address at which the corresponding receiving institution is reachable over the communication network 109. The lookup may include matching a URL parsed from the data encoding to a URL of an encoding scheme in the directory database. In some examples, the lookup may include identifying a string encoding used in the encoding scheme and converting the string encoding into ASCII text to match the text from the encoded data to text of an encoding scheme in the directory database. An example of parsing is also described with respect to Table 1 and the directory database 153.

In some examples, when the receiving institution (and the second closed loop payment system) is identified, the method 900 may include determining whether the first closed loop payment system permits payments to the second closed loop payment system and/or whether the second closed loop payment system permits payments to be received from the first closed loop payment system. In these examples, the method 900 may include accessing a payment rule (such as from the rules database 151) specifying a plurality of payment systems to which the first closed loop payment system will pay. The method 900 may further include determining that the second closed loop payment system is among the plurality of payment systems to which the first closed loop payment system will pay and processing may proceed to 906. On the other hand, if the payment rule indicates that the second closed loop payment system is not among the plurality of payment systems to which the first closed loop payment system will pay, the method 900 may return an exception back to the wallet server with such indication.

In some examples, the method 900 may include accessing an acceptance rule (such as from the rules database 151) specifying a plurality of payment systems from which the second closed loop payment system will accept payments. The method 900 may further include determining that the first closed loop payment system is among the plurality of payment systems from which the second closed loop payment system will accept payments and processing may proceed to 906. On the other hand, if the payment rule indicates that the first closed loop payment system is not among the plurality of payment systems from which the second closed loop payment system will accept payments, the method 900 may return an exception back to the wallet server with such indication.

At 906, the method 900 may include transmitting, by the server, the encoded data to the receiving institution. The method 900 may include identifying a network address such as a URL at which the receiving institution may accept the encoded data for validation and identification of recipients. For example, the directory database may include the network address stored in association with a respective receiving institution. In other examples, the URL or other network address may be included with and read from the encoded data.

At 908, the method 900 may include receiving a response from the receiving institution, the response comprising a recipient identifier and a recipient attribute.

At 910, the method 900 may include mediating the payment from the sender closed loop account to a recipient closed loop account (such as another closed loop user account or a closed loop merchant account) based on the receiving institution, the recipient identifier and the recipient attribute.

In some examples, mediating the payment may include accessing a participation rule (such as from the rules database 151) that specifies a level of payment processing to be conducted via the wallet connector system on behalf of the first closed loop payment system. In some of these examples, the level of payment processing may include payment clearing-and-settlement, in which case the method 900 may include identifying a payment card number (such as an account reference number 135) assigned to and funded by the sender closed loop account in the first closed loop payment system and a payment network merchant account identifier (such as a payment network merchant identifier 137) assigned to the recipient closed loop account in the second closed loop payment system, the payment card number and the payment network merchant account identifier being recognized by a payment network (such as payment network 160). The method 900 may further include transmitting, via the payment network, a payment request to be funded from the payment card number to the payment network merchant account identifier (such as to an account identified by the payment network merchant account identifier).

In some examples, mediating the payment may include determining that the sender closed loop account has not been assigned with a payment card number recognized by a payment network. In these examples, the method 900 may further include generating a payment card number for the sender closed loop account responsive to determining that the sender closed loop account has not been assigned with the payment any payment card number recognized by the payment network. For example, the method 900 may dynamically generate, after the encoded data is received from the wallet server, the payment card number to mediate the payment.

In some examples, to mediate pull payments in which the recipient is to pull the payment, the method 900 may include transmitting a payment credential to a receiving endpoint that processes the payment on behalf of the recipient.

In some examples, the level of payment processing may include payment switching-and-routing, in which case mediating the payment may include transmitting, to the first closed loop payment system, a transaction payload based on the identity of the recipient, a payment amount, and an identification of the second closed loop payment system. The method 900 may further include receiving, from the first closed loop payment system, an approval message responsive to the transaction payload, and transmitting, to the second closed loop payment system, an indication of the approval message. In some of these examples, the method 900 may further include generating a reconciliation statement indicating a payment transaction between the first closed loop payment system and the second closed loop payment system based on the transaction payload. As such, in these examples, the first closed loop payment system and the second closed loop payment system may have a trusted record of the payment and may facilitate the transfer of funds between their respective financial institutions.

Figure 10:
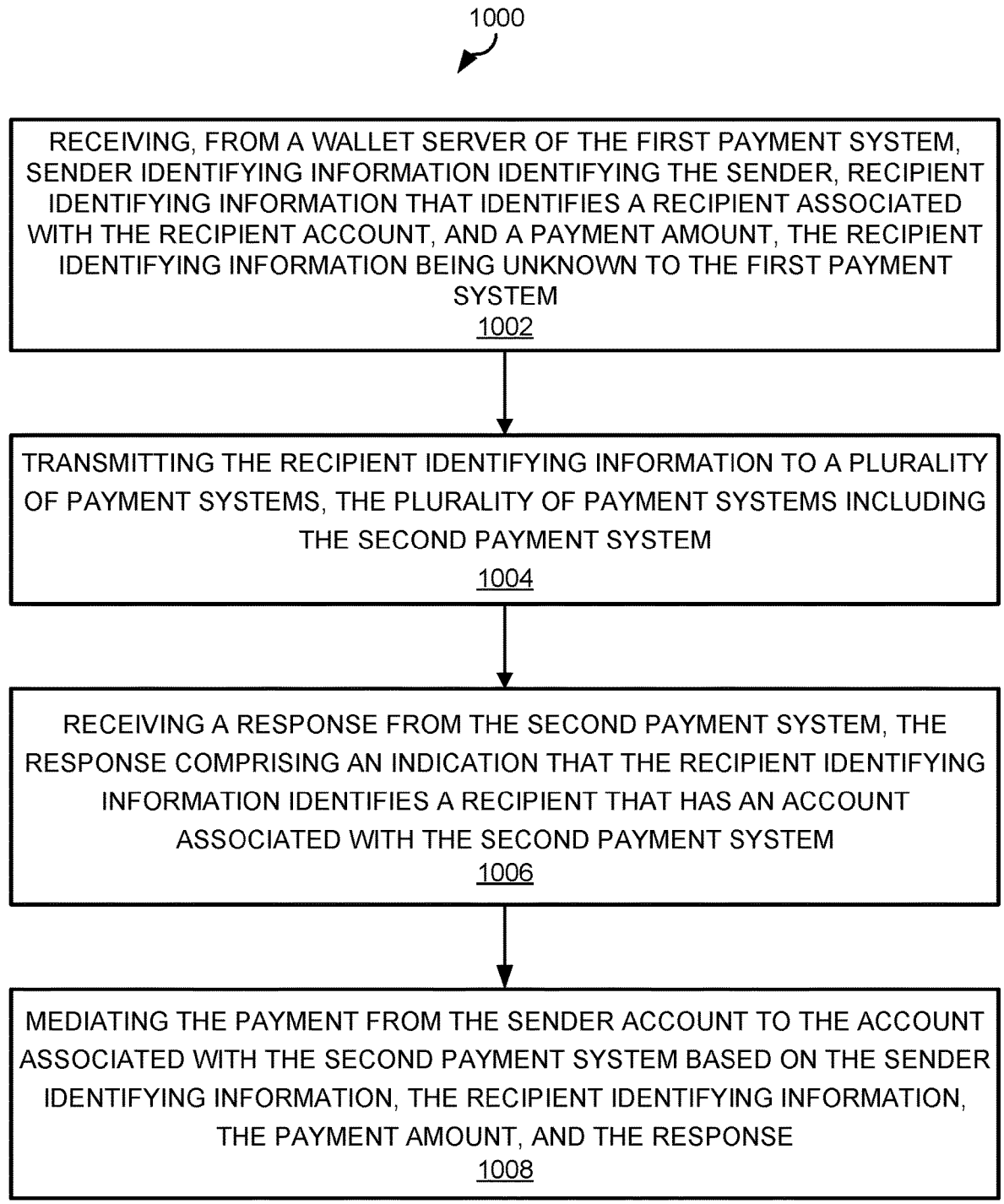
FIG. 10 illustrates another example of a method of facilitating payments through payment clearing-and-settlement.

FIG. 10 illustrates another example of a method 1000 of facilitating payments through payment clearing-and-settlement. The method 1000 may be implemented by a computer system 800 to mediate payment from a sender that has an account at a first payment system to a recipient at a second payment system that is incompatible with the first payment system. In particular, the method 1000 may be implemented by the wallet connector server 154 in the wallet connector system 150.

At 1002, the method 1000 may include receiving, from a wallet server of the first payment system, sender identifying information identifying the sender, recipient identifying information that identifies a recipient associated with the recipient account, and a payment amount, the recipient identifying information being unknown to the first payment system. In some examples, the recipient identifying information may include an email address, a unique identifier (such as a merchant identifier), a data encoding scanned from a digital encoding (such as digital encoding 201), and/or other information that may identify a recipient.

At 1004, the method 1000 may include transmitting the recipient identifying information to a plurality of payment systems, the plurality of payment systems including the second payment system. For example, block 1004 may be implemented to identify a payment system at which the recipient identified by the recipient identifying information has an account. For implementations in which the recipient identifying information includes encoded data that identifies a merchant, block 1004 may be triggered by a determination a receiving institution of a payment system cannot be identified based on the encoded data. For example, the method 1000 may include performing a lookup based on the directory database 153 and determining that an encoding scheme used by the encoded data is not in the directory database 153. Responsive to such determination, block 1004 may be trigger to perform the transmitting to identify a receiving institution associated with a payment system associated with the recipient.

At 1006, the method 1000 may include receiving a response from the second payment system, the response comprising an indication that the recipient identifying information identifies a recipient that has an account associated with the second payment system and an attribute of the recipient.

At 1008, the method 1000 may include mediating the payment from the sender account to the account associated with the second payment system based on the sender identifying information, the recipient identifying information, the payment amount, and the response. For example, mediating the payment may include clearing-and-settlement (an example of which is illustrated in FIG. 4) or switching-and-routing (an example of which is illustrated in FIG. 5).

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "130A-N" does not refer to a particular number of instances of 130, but rather "two or more."

The rules database 151, directory database 153, the ARN database 155, and/or other databases described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of mediating a payment, funded by a sender closed loop account in a first closed loop payment system, to a recipient closed loop account in a second closed loop payment system that is incompatible with the first closed loop payment system, the method comprising:
   receiving, by a server in a wallet connector system, encoded data from a wallet server of the sender closed loop account in the first closed loop payment system, wherein the encoded data:
      uses an encoding scheme that specifies a manner in which the encoded data encodes identity information,
      is based on a digital encoding of the recipient closed loop account in the second closed loop payment system, and
      is incompatible with the first closed loop payment system due to the encoding scheme not being recognized by the first closed loop payment system;
   recognizing, by the server in the wallet connector system, that the encoding scheme is used by a receiving institution of the second closed loop payment system by:
      accessing a directory database of payment systems with associated encoding data schemes;
      identifying the manner in which the encoded data encodes the identity information specified by the encoding scheme by:
         performing an encoding scheme lookup in the directory database that matches the encoding scheme of the received encoded data by:
            using ASCII text regular expressions to determine a match of the encoding scheme of the received encoded data with one of the encoding data schemes associated with one of the payment systems in the directory database; or
            decoding hexadecimal values to determine the match of the encoding scheme of the received encoded data with one of the encoding data schemes associated with one of the payment systems in the directory database, and
      associating the manner with the receiving institution of the second closed loop payment system;
   responsive to the recognition, transmitting, by the server in the wallet connector system, the encoded data to the receiving institution of the second closed loop payment system;
   receiving, by the server in the wallet connector system, a response from the receiving institution, the response comprising a recipient identifier and a recipient attribute; and
   mediating, by the server in the wallet connector system, the payment, via (i) settlement and clearing or (ii) switching-and-routing, from the sender closed loop account to the recipient closed loop account based on the recipient identifier and the recipient attribute;

wherein the settlement and clearing by the wallet connector system includes:
  transmitting recipient identifying information of the second closed loop system to the wallet server in the first closed loop payment system; and
  causing funds of the sender of the first closed loop system to be credited to the recipient in the second closed loop payment system; and
wherein the switching-and-routing includes:
  transmitting to the first closed loop payment system a transaction payload including an identification of the second closed loop payment system to enable the first closed loop payment system to perform the settlement and clearing;
  receiving an approval message from the first closed loop payment system in response to transmitting the transaction payload; and
  transmitting to the second closed loop payment system an indication of the approval message.

2. The method of claim 1, wherein mediating the payment comprises:
  accessing a participation rule that specifies a level of payment processing to be conducted via the wallet connector system on behalf of the first closed loop payment system; and
  mediating the payment is based further on the participation rule.

3. The method of claim 2, wherein the level of payment processing comprises payment via clearing and settlement, and wherein mediating the payment comprises:
  identifying an account reference number assigned to and funded by the sender closed loop account in the first closed loop payment system and a payment network merchant account identifier assigned to the recipient closed loop account in the second closed loop payment system, the account reference number and the payment network merchant account identifier being recognized by a payment network; and
  transmitting, via the payment network, a send payment request to be funded from the account reference number to the payment network merchant account identifier.

4. The method of claim 2, wherein the level of payment processing comprises payment clearing and settlement, and wherein mediating the payment comprises:
  determining that the sender closed loop account has not been assigned with an account reference number recognized by a payment network; and
  generating an account reference number for the sender closed loop account responsive to determining that the sender closed loop account has not been assigned with any account reference number recognized by the payment network.

5. The method of claim 2, wherein the level of payment processing comprises payment clearing and settlement, and wherein mediating the payment comprises:
  transmitting a payment credential to a receiving endpoint that processes the payment on behalf of the recipient.

6. The method of claim 2, wherein the level of payment processing comprises payment switching-and-routing, and wherein mediating the payment comprises:
  transmitting, to the first closed loop payment system, the transaction payload further including the recipient identifier, and a payment amount.

7. The method of claim 6, wherein mediating the payment further comprises:
  generating a reconciliation statement indicating a payment transaction between the first closed loop payment system and the second closed loop payment system based on the transaction payload.

8. The method of claim 1, the method further comprising:
  accessing a payment rule specifying a plurality of payment systems to which the first closed loop payment system will pay; and
  determining that the second closed loop payment system is among the plurality of payment systems to which the first closed loop payment system will pay, wherein the encoded data is transmitted to the receiving institution responsive to the determining that the second closed loop payment system is among the plurality of payment systems.

9. The method of claim 1, the method further comprising:
  accessing an acceptance rule specifying a plurality of payment systems from which the second closed loop payment system will accept payments; and
  determining that the first closed loop payment system is among the plurality of payment systems from which the second closed loop payment system will accept payments, wherein the encoded data is transmitted to the receiving institution responsive to the determining that the first closed loop payment system is among the plurality of payment systems.

10. The method of claim 1, wherein the digital encoding comprises a Quick Response (QR) code, and wherein recognizing that the encoding scheme is used by the receiving institution of the second closed loop payment system further comprises:
  determining, by the server, an encoding scheme decoded from the QR code, wherein the receiving institution is identified based on the determined encoding scheme.

11. A system of mediating a payment, funded by a sender closed loop account in a first closed loop payment system, to a recipient closed loop account in a second closed loop payment system that is incompatible with the first closed loop payment system, the system comprising:
  a server in a wallet connector system to:
  receive encoded data from a wallet server of the sender closed loop account in the first closed loop payment system, wherein the encoded data:
    uses an encoding scheme that specifies a manner in which the encoded data encodes identity information,
    is based on a digital encoding of the recipient closed loop account in the second closed loop payment system, and
    is incompatible with the first closed loop payment system due to the encoding scheme not being recognized by the first closed loop payment system;
  access a directory database of payment systems with associated encoding data schemes;
  recognize that the encoding scheme is used by a receiving institution of the second closed loop payment system by:
    identifying the manner in which the encoded data encodes the identity information specified by the encoding scheme by:
      performing an encoding scheme lookup in the directory database that matches the encoding scheme of the received encoded data by:
        using ASCII text regular expressions to determine a match of the encoding scheme of the received encoded data with one of the encoding data schemes associated with one of the payment systems in the directory database; or decoding hexadecimal values to determine the match of the encoding scheme of the received encoded data with one of the encoding data schemes associated with one of the payment systems in the directory database, and associating the manner with the receiving institution of the second closed loop payment system;

responsive to the recognition, transmit the encoded data to the receiving institution of the second closed loop payment system;

receive a response from the receiving institution, the response comprising a recipient identifier and a recipient attribute; and mediate the payment, via (i) settlement and clearing or (ii) switching and routing switching-and-routing, from the sender closed loop account to the recipient closed loop account based on the recipient identifier and the recipient attribute;

wherein the settlement and clearing by the wallet connector system includes:
transmitting recipient identifying information of the second closed loop system to the wallet server in the first closed loop payment system; and
causing funds of the sender of the first closed loop system to be credited to the recipient in the second closed loop payment system; and wherein the switching-and-routing includes:
transmitting to the first closed loop payment system a transaction payload including an identification of the second closed loop payment system to enable the first closed loop payment system to perform the settlement and clearing;
receiving an approval message from the first closed loop payment system in response to transmitting the transaction payload; and
transmitting to the second closed loop payment system an indication of the approval message.

12. The system of claim 11, wherein to mediate the payment, the server is further to:
transmit, to the first closed loop payment system, transaction payload based on further including the recipient identifier, and a payment amount.

13. The system of claim 11, wherein to mediate the payment, the server is further to:
identify an account reference number assigned to and funded by the sender closed loop account in the first closed loop payment system and a payment network merchant account identifier assigned to the recipient closed loop account in the second closed loop payment system, the account reference number and the payment network merchant account identifier being recognized by a payment network; and
transmit, via the payment network, a send payment request to be funded from the account reference number to the payment network merchant account identifier.

14. A system of mediating a payment from a sender account of a first payment system to a recipient account in a second payment system that is incompatible with the first payment system, the system comprising:
a server to:
receive, from a wallet server of the first payment system, sender identifying information identifying a sender, recipient identifying information that identifies a recipient associated with the recipient account, and a payment amount, the recipient identifying information being unknown to the first payment system such that the first payment system is unable to communicate with the second payment system to complete the payment from the sender account to the recipient account;
transmit the recipient identifying information to a plurality of payment systems, the plurality of payment systems including the second payment system;
receive a response from the second payment system, the response comprising an indication that the recipient identifying information identifies a recipient that has an account associated with the second payment system and an attribute of the recipient; and
mediate the payment from the sender account to the account associated with the second payment system based on the sender identifying information, the recipient identifying information, the payment amount, and the response.

15. The system of claim 14, wherein the recipient identifying information comprises encoded data encoded using an encoding scheme used by the second payment system, wherein the server is further to:
access a directory database that stores a plurality of encoding schemes, each encoding scheme of the plurality of encoding schemes being mapped to a respective one of a plurality of receiving institutions, each receiving institution of the plurality of receiving institutions; and
perform a lookup based on the directory database and the encoding scheme to identify a receiving institution to which to transmit the encoded data; and
determine, based on the lookup, that the encoding scheme is not stored in the directory database, wherein the encoding data is transmitted to the plurality of payment systems to identify a payment system that is associated with the recipient identifying information.

16. The system of claim 14, wherein to mediate the payment, the server is further to:
transmit, to the first payment system, a transaction payload based on an identity of the sender, the identity of the recipient, a payment amount, and an identification of the second payment system;
receive, from the first payment system, an approval message responsive to the transaction payload; and
transmit, to the second payment system, an indication of the approval message.

17. The system of claim 14, wherein to mediate the payment, the server is further to:
identify an account reference number, recognized by a payment network, assigned to and funded by the recipient account; and
transmitting, via the payment network, a payment request that identifies the account reference number as a payment card number.

18. The system of claim 14, wherein to mediate the payment, the server is further to:
determine that the sender account has not been assigned with an account reference number recognized by a payment network; and
generate the account reference number for the sender account responsive to determining that the sender account has not been assigned with any account reference number recognized by the payment network; and transmit, via the payment network, a payment request that identifies the account reference number as a payment card number.

\* \* \* \* \*